United States Patent
Paulsen et al.

(10) Patent No.: US 11,124,032 B2
(45) Date of Patent: Sep. 21, 2021

(54) METHOD FOR PRODUCING MOTOR VEHICLE CONTROLS AND THE RESULTING MOTOR VEHICLE CONTROL

(71) Applicant: Benteler Automobiltechnik GmbH, Paderborn (DE)

(72) Inventors: Frode Paulsen, Gjøvic (NO); Marco Füllgräbe, Bühren-Ahden (DE); Arne Schnieders, Bielefeld (DE); Stephan Meyer, Bielefeld (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 150 days.

(21) Appl. No.: 16/445,835

(22) Filed: Jun. 19, 2019

(65) Prior Publication Data

US 2019/0389264 A1 Dec. 26, 2019

(30) Foreign Application Priority Data

Jun. 25, 2018 (DE) ...................... 10 2018 115 166.7

(51) Int. Cl.
*B60G 7/00* (2006.01)
*B21C 23/00* (2006.01)
(Continued)

(52) U.S. Cl.
CPC ............ *B60G 7/001* (2013.01); *B21C 23/002* (2013.01); *B21C 23/142* (2013.01);
(Continued)

(58) Field of Classification Search
CPC ............ B60G 7/001; B60G 2206/7102; B60G 2206/8105; B60G 2206/811;
(Continued)

(56) References Cited

U.S. PATENT DOCUMENTS

| 6,810,586 | B1 * | 11/2004 | Waaler | B60G 7/001 29/897.2 |
| 2006/0175788 | A1 * | 8/2006 | Nuno | B60G 3/20 280/124.153 |

(Continued)

FOREIGN PATENT DOCUMENTS

| DE | 102010018903 | 12/2010 |
| WO | WO 2008/082305 | 7/2008 |

*Primary Examiner* — Darlene P Condra
(74) *Attorney, Agent, or Firm* — Jacobson Holman PLLC

(57) ABSTRACT

A method for producing motor vehicle controls from extruded profiles and a motor vehicle control. A length section of an extruded profile strand is provided and this is either processed by cutting technology and divided into several extrusion profiles or is first divided into several extruded profiles and they are then processed via shear cutting. By means of a mechanical processing of the extrusion profiles, the motor vehicle controls are formed. The length section has a double T-shaped cross-section with a brace and two belts aligned perpendicular to the brace, wherein the end-side of the belts are connected to flanges. During manufacturing, a motor vehicle control is produced with a steering element, which comprises a middle part and two side arms. In the middle part as well as in the side arms, bearing housings are configured.

11 Claims, 7 Drawing Sheets

(51) Int. Cl.
 *B21C 23/14* (2006.01)
 *C22F 1/04* (2006.01)
(52) U.S. Cl.
 CPC .......... *B60G 2206/124* (2013.01); *B60G 2206/7102* (2013.01); *B60G 2206/811* (2013.01); *B60G 2206/8105* (2013.01); *B60G 2206/84* (2013.01); *C22F 1/04* (2013.01)
(58) Field of Classification Search
 CPC .......... B60G 2206/84; B60G 2206/124; B21C 23/002; B21C 23/142; C22F 1/04; B23P 15/00
 See application file for complete search history.

(56) References Cited

U.S. PATENT DOCUMENTS

2016/0121678 A1\* 5/2016 Meier ................ B23P 15/00
                                                    280/124.134
2016/0355914 A1\* 12/2016 Takemura .......... B22D 21/007
2017/0057546 A1\* 3/2017 Dressel .............. B22D 21/007
2019/0092115 A1\* 3/2019 Paulsen ............... B60G 7/001

\* cited by examiner

METHOD FOR PRODUCING MOTOR VEHICLE CONTROLS AND THE RESULTING MOTOR VEHICLE CONTROL

BACKGROUND OF THE INVENTION

The invention relates to the method for producing motor vehicle controls.

A motor vehicle control in the form of a transverse control arm is considered prior art from DE 10 2010 018 903 A1. The transverse control arm disclosed there has a bracket that is made from an extrusion profile by way of bending. A bearing housing is welded to each of the leg end of the bracket and a joint housing to the back of the bracket. Therefore, at least one bending operation and welding process are required for the production.

Even the motor vehicle control disclosed in WO 2008/082 305 A1 is made from an extruded profile and an extruded profile, respectively. The motor vehicle control has a middle part and two side arms. For production, a length of the workpiece is separated from an extruded profile.

The workpiece is then cut and plastically deformed, wherein the side arms are bent apart to obtain a curved shape around the vertical axis (z axis) of the motor vehicle control. A bending operation is also necessary for this procedure.

SUMMARY OF THE INVENTION

Starting with prior art, the invention is based on the task of providing an efficient and cost-effective method for producing high-quality motor vehicle controls and creating a corresponding motor vehicle control.

A first procedure for manufacturing motor vehicle controls provides the following steps:
 a) Providing a length section of an extruded profile strand,
 b1) Processing the length section via shearing technology,
 c1) Splitting the processed length section into multiple strand profiles,
 d) Mechanical processing of the extrusion profiles to form each motor vehicle control.

A second procedure for manufacturing motor vehicle controls from extrusion profiles includes the following steps:
 a) Providing a length section of an extruded profile strand,
 b2) Splitting the length section into multiple extrusion profiles,
 c2) Processing of the individual extrusion profiles via shearing, and
 d) Mechanical processing of the extrusion profiles to form respectively one motor vehicle control.

The shearing technology includes in particular cutting and/or punching operations on the long profile or on the extruded profiles taken from the long profile.

Mechanical processing includes in particular machining processes such as milling, drilling, and/or punching and cutting, respectively.

Splitting the length section into multiple extruded profiles means that the length section is divided into at least two or more extruded profiles.

The extruded profile strand, from which the length sections are provided, is an extrusion profile made of metal or metal alloy, in particular light metal alloy. Preferably medium-strength, particularly high-strength aluminum alloys are used. An advantageous material is the aluminum alloy 6082 T6. This has good strength characteristics and is very well suited for machining. In addition, the material is corrosion resistant.

In the context of the invention, aluminum alloys of the 6,000 series or the 7,000 series are particularly preferred.

The length section is a long product with a constant cross section whose length is greater than its thickness and width. This length section, which is usually longer than 1 m, is in particular longer than 2 m, forms the starting product or starting profile for the production of individual extrusion press profiles and the motor vehicle control, respectively.

This length section is extruded in the x-direction according to the extruded profile. In y-direction transverse to the x-direction, an alignment can occur prior to the production of the motor vehicle controls. In this process, the initial profile or the extruded profiles separated therefrom are stretched in particular in the y-direction.

In the shearing process of the length section or during shearing processing of the extrusion profiles and/or during mechanical processing of the extrusion profiles, bearing housings are generated.

The shearing processing of the length section, as well as the shearing processing of the extrusion profiles can include punching, cutting, and/or milling operations both on the bridge and on the lateral belts of the length section or the extrusion profile.

In addition, mechanical processing of the extrusion profiles may include the formation of conversions and/or beads. These are designed in such a way that they increase particularly the bending stiffness of the transverse control arm.

In particular, it is provided that the extrusion profiles and the lateral arms of the motor vehicle control generated by it do not undergo any deformation process representing bending, in particular a bending process about the z axis.

An important and particularly advantageous aspect of the invention provides for a length section being used with a double T-shaped cross section. This comprises a central section in the brace and two transverse, in particular right-angled belts aligned with the brace. Longitudinal flanges follow at the end of the belts.

Although a double-T-shaped cross section is particularly advantageous, the length sections as well as the extrusion profiles, may also show a different geometric profile, for example, be embodied L-shaped or H-shaped, or have similar hollow profile structures.

In addition, the length sections and/or the extrusion profiles and the motor vehicles produced therefrom can also have different wall thicknesses. Here extrusion profiles are used which have areas with different wall thicknesses.

In the shearing processing of the length section or in the shearing processing of the extrusion profiles, recesses are punched into the brace, as well as simultaneously or time-offset sections of the flanges and/or the belts are removed.

The length section, which is formed by the output profile or an already separated extrusion profile, are aligned before the processing steps and in particular stretched in the y-direction transverse to the longitudinal axis (x-direction).

The method according to the invention for producing motor vehicle controls is characterized by its efficiency. It is also an economical process and cost effective. In addition, high-quality motor vehicle controls are manufactured with high rigidity, which in particular can forward and transmit forces in a motor vehicle control installed in a motor vehicle upon the upper control level. There is a high degree of material utilization.

Bending operations on motor vehicle controls are not necessary in the case of the production of conversion to side edges or beads for increasing rigidity. In particular, it is not necessary to convert the areas of the extrusion profile forming the lateral arms of a motor vehicle control via bending technology, in particular around the z axis, thus the vertical axis.

A motor vehicle control according to the invention represents particularly a transverse brace for double control-arm axles. The motor vehicle control has a steering element made from an extruded profile. The steering element has a middle part and two side arms.

A bearing housing is provided both in the middle part and also in each of the side arms.

The motor vehicle control or the steering element is made from an extruded profile, which has a double T-shaped cross-section with a brace and two belts aligned to the brace, wherein the flange is connected at end-side of the belts. This cross-sectional profile is formed into the steering element, namely by means of shearing processing steps using punching, drilling, milling, and/or cutting.

The middle part of the steering element is made from the brace of the initial profile. The middle part comprises a central bearing housing section and two connection sections, with one connection section each extending from the bearing housing section to a side wall of a side arm. The side arms with their side walls are made from the belts of the initial profile. The side walls are aligned transverse to the level of the middle part. Each side wall has a widened end section in each case, in which the bearing housing is respectively formed.

Each side wall has also an upper and a lower flange section. These are made from the flanges of the initial profile.

For increase in stiffness, a lateral edge of the middle part can have a converted flange. The flange is set transverse from the level of the middle part and forms a collar. Preferably, the flange is formed on the side edge of the middle part aligned to the bearing housings in the side walls. It is also advantageous when this flange extends over the length of the middle part to the end sections.

The middle part generally comprises a V-shaped or U-shaped configuration. The middle part with the central bearing housing section and the bearing housing formed therein represents a front part of the motor vehicle control.

From the middle part, the connection sections extend respectively diagonally to the rear. At the end, the side arms of the motor vehicle control are connected thereto. Transverse to the bearing housing in the middle part, the bearing housings are provided in the side arms. These can be completed by bearing sockets.

At least one bead is formed in the middle part for increasing the rigidity. Preferably, in the connection section of the middle part, a bead extends respectively from the bearing housing section towards the side arms.

Furthermore, the motor vehicle control can have different wall thicknesses at various sections. For this purpose, an extrusion profile is used, which comprises a brace with sectionally different wall thicknesses. Accordingly, the bearing housing section of the middle part is designed in such a way that it has a larger wall thickness than the adjacent connection sections.

One aspect of the invention provides that the length sections and/or the extruded profiles and/or the motor vehicle controls are subjected to a heat treatment. As a result, the material or component properties are adjusted. Heat treatment can only be carried out partially on the length section, the extrusion profiles, or on the motor vehicle controls. Heat treatment can take place between the individual manufacturing steps or on the finished motor vehicle control.

An additional motor vehicle control according to the invention, in particular a control arm for double-control arm axles, comprises a steering element that consists of an extruded profile and shows at least two connection points. Connection points within the meaning of the invention are in particular bearing housings.

The base body and/or the steering element of the motor vehicle control according to the invention are produced in a single piece of material from an extruded and mechanically processed extrusion profile. The steering element has a middle part and two side arms. Material accumulations are formed at the ends of the side arms. Material accumulations are produced as widened end sections by cutting the extrusion profile. The connection points or bearing housings in the end sections of the side arms have a common central axis. In the middle section, a connection point is provided in the form of another bearing housing, whose center axis runs perpendicular to the center axis of the bearing housings in the side arms.

DESCRIPTION OF THE DRAWINGS

In the following, the invention is described in greater detail based on design examples. It is shown in.

DETAILED DESCRIPTION OF THE INVENTION

Figure 1:
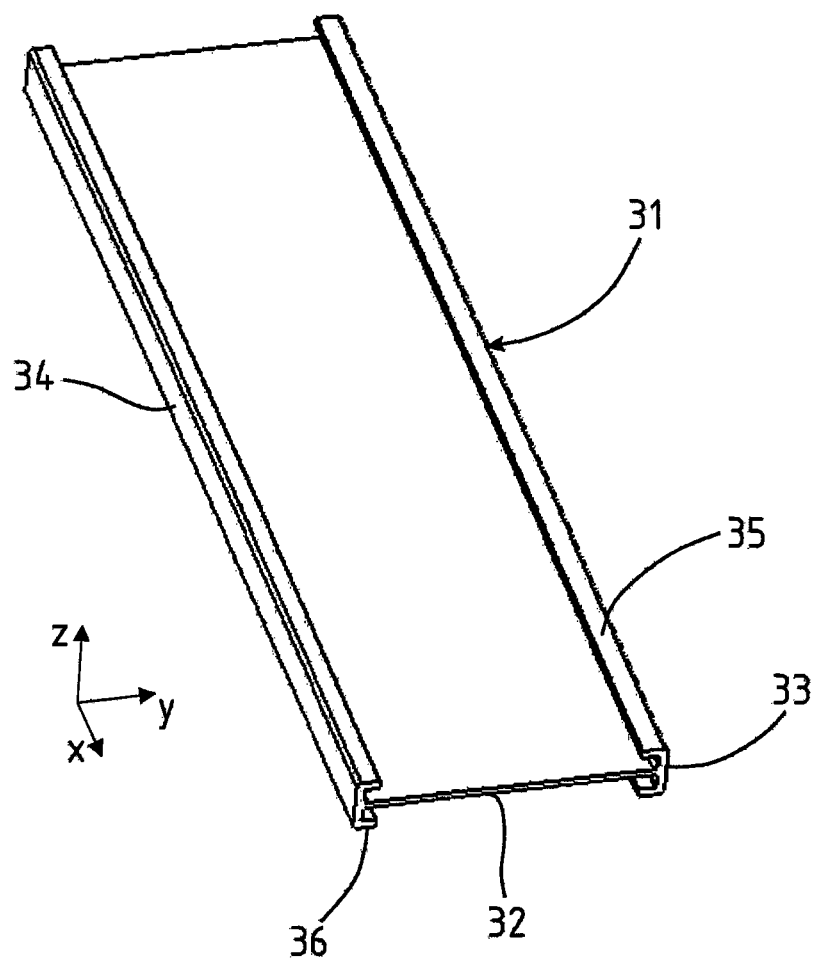
FIG. 1 is a perspective length section of an extruded profile.

The motor vehicle control 1 in FIGS. 6-9 comprises a steering element 2 from an extruded press profile. The steering element 2 has a middle part 3 and two side arms 4, 5. In the middle part 3, a bearing housing 6 is provided. Likewise, in every side arm 4, 5 a bearing housing 7, 8 is formed.

The middle part 3 is configured in a V-shaped or U-shaped manner.

Figure 6:
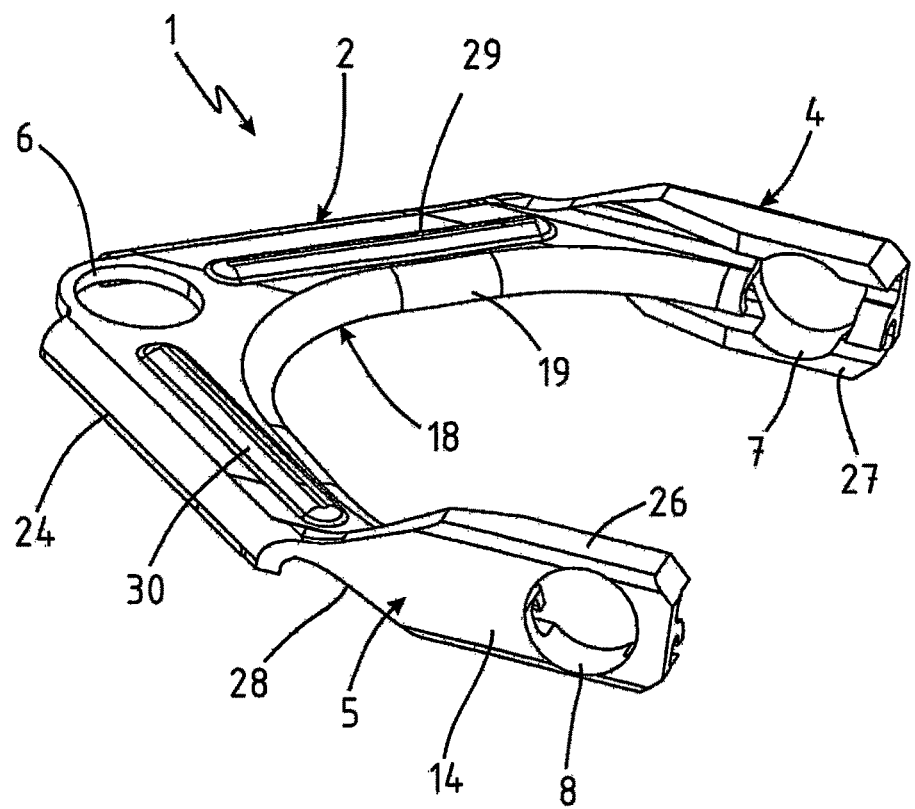
FIG. 6 is a perspective view of the steering element of a motor vehicle control.

The middle part 3 comprises a central bearing housing section 9. In the bearing housing section 9, the bearing housing 6 is provided. It accepts a ball joint 10. Furthermore, the middle part 3 comprises two connection sections 11, 12. The connection sections 11, 12 each extend from the bearing housing section 9 to a side wall 13, 14 of a side arm 4 or 5 diagonally from the bearing housing 6 in a V-shaped manner to the rear. The side walls 13, 14 of the side arms 4, 5 are aligned transverse to the horizontal level of the middle part 3. Each side wall 13, 14 comprises an end section 15, 16, in which the bearing housing 7 or 8 is configured. The bearing housing 7, 8, as shown in FIG. 6, can already serve alone to accommodate a bearing. It is also possible to insert a bearing socket 17 in the bearing housing 7, 8, as amended in FIGS. 7 to 9.

Figure 7:
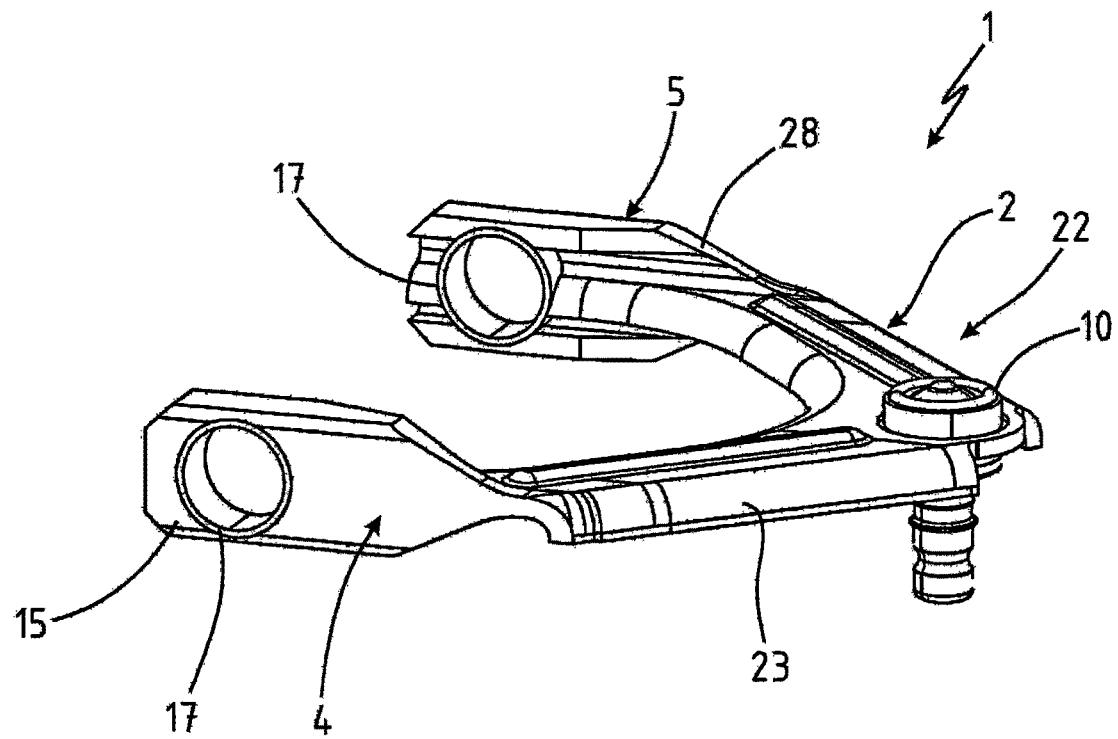
FIG. 7 is a different perspective view of a motor vehicle control.
Figure 8:
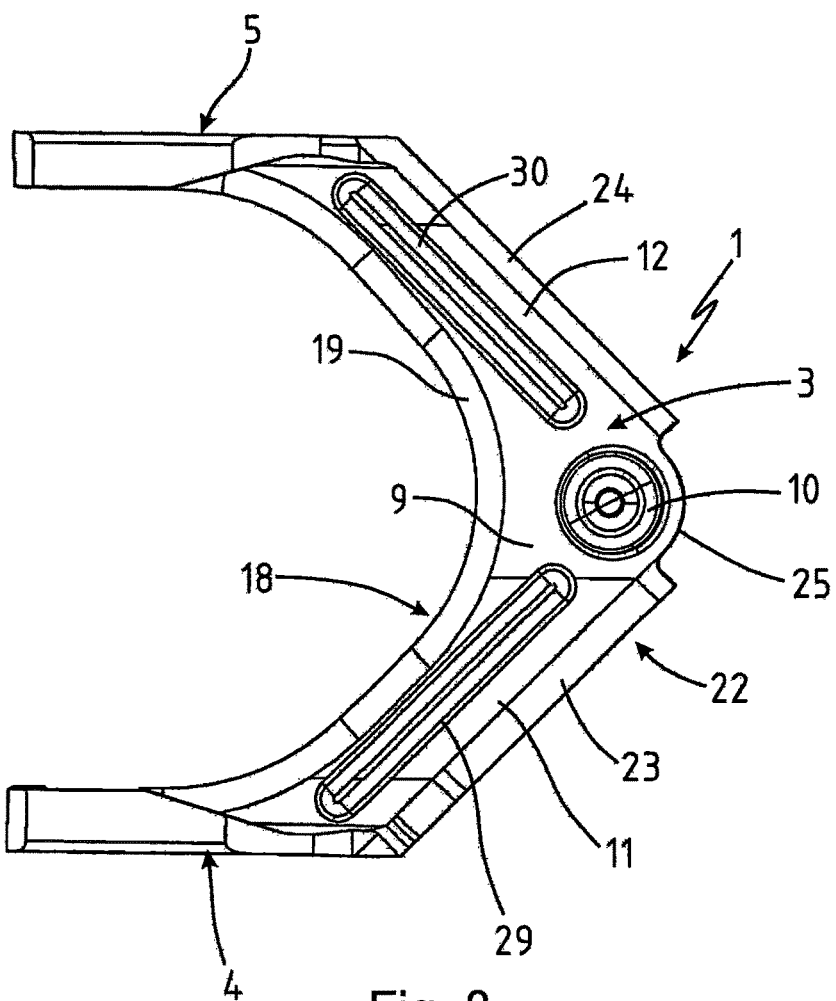
FIG. 8 is a top view of FIG. 7.
Figure 9:
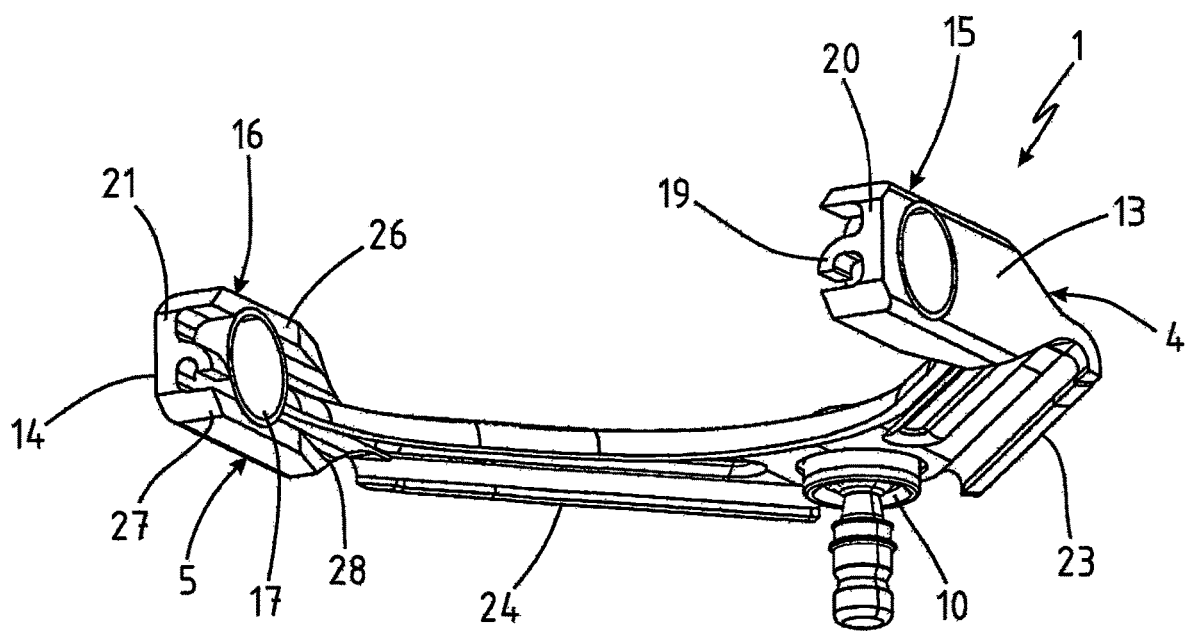
FIG. 9 is a bottom perspective view of the motor vehicle control.

The rear side edge 18 of the middle part 3 is converted in the image level from the FIGS. 6, 7 and 9 to the bottom of the arc. This conversion 19 extends on the inside of the middle part 3 between the side arms 4, 5 over the length of the middle part 3 to the end sections 15, 16. It is discernible that the conversion 19 is respectively interrupted by a bearing housing 7, 8, but then continues until the free end of 20, 21 of the end sections 15, 16. The rear side edge 18 of the middle part 3 extends here in a curved or U-shaped manner.

Conversions 23, 24 are also formed on the front side edge 22 of the middle part 3. The front edge 22, in the area of a connection section 11, 12, is respectively switched downwards and equipped with a conversion 23, 24. The front arc section 25 of the bearing housing section 9 is free of conversion.

Furthermore, it is discernible that the side walls 13, 14 each have upper flange sections 26 and lower flange sections 27. These are aligned to each other inwardly with respect to the steering element 2. On the transition to the connection sections 11, 12, the side walls 13, 14 taper through diagonal sections 28 to the middle part 3.

In the longitudinal extension of a connection section 11, 12, a bead 29, 30 is formed upwards from the level of the middle part 3. The beads 29, 30, as well as the conversions 19, 23, 24 serve to increase the stiffness.

Figure 2:
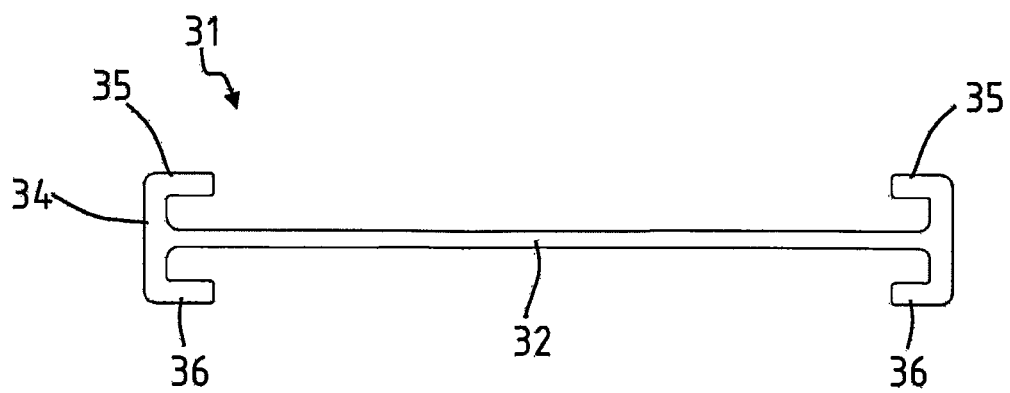
FIG. 2 is a front view of a cross-section of FIG. 1.

To produce a motor vehicle control 1 according to the invention, a length section 31 of an extruded profile is used. This is shown in FIGS. 1 and 2. The extruded profile strand or the length section 31 is made, in particular, of a high-strength aluminum alloy. The length section 31 can have a length of 1 m and greater. For the practice, the use of length sections 31 with a length of 2 to 8 m is also planned.

The length section 31 comprises a double T-shaped cross section on a central brace 32 and at each end, laterally perpendicular to the brace 32, belts 33, 34. The belts 33, 34 extend in the longitudinal direction (x-direction) according to the extrusion direction of the extruded profile strand. On the end, the belts 33, 34 on the inside are connected to the flanges 35, 36 facing inside.

Figure 3:
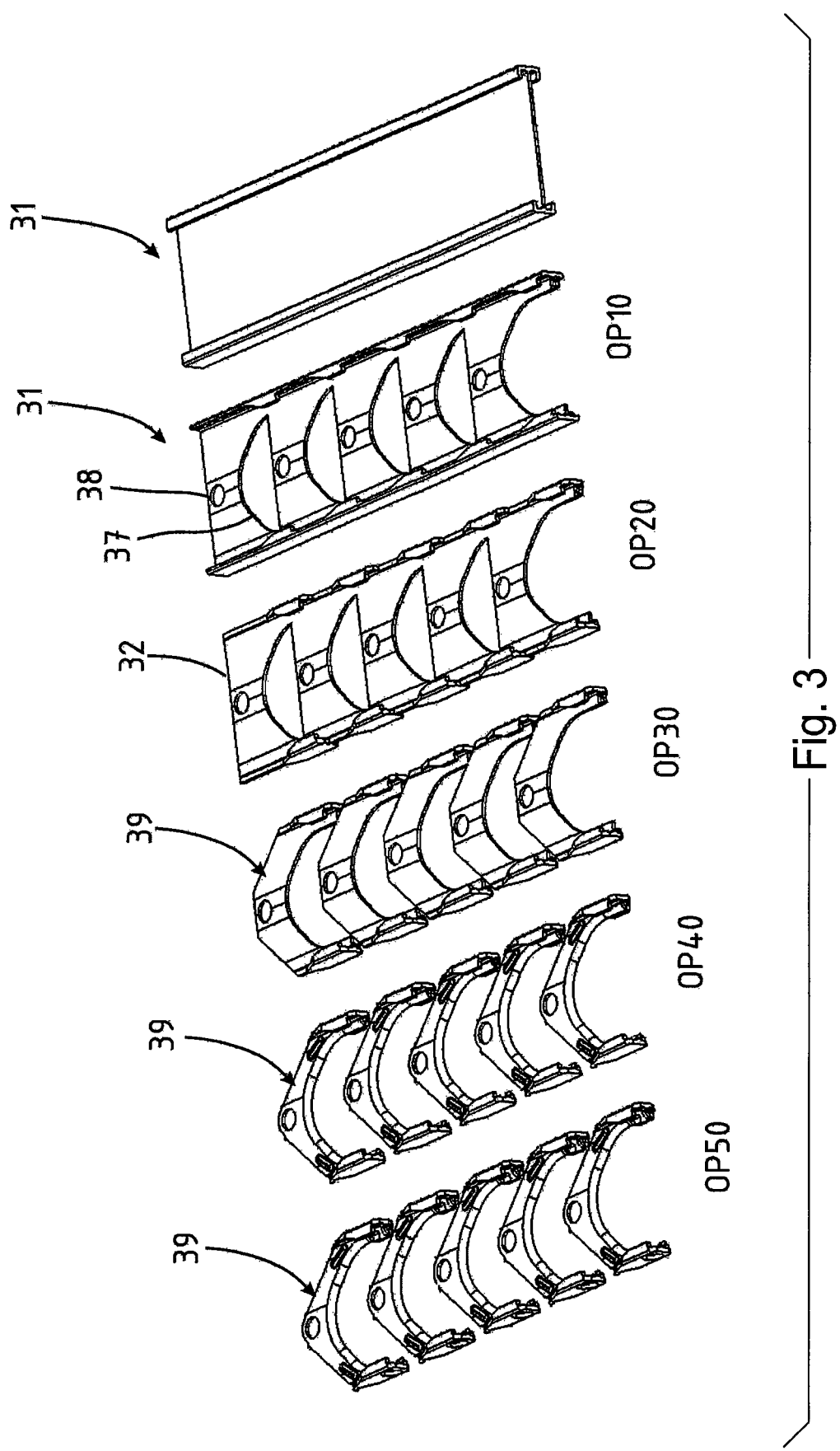
FIG. 3 shows the production of motor vehicle controls in various processing steps.

A first production sequence of a method for manufacturing a motor vehicle control 1 is explained by means of FIG. 3.

In a first production step OP10, the length section 31 of the extruded profile strand is processed by cutting technology. Here, arc-shaped or crescent recesses 37 are punched in the brace 32 of the length section 31. Furthermore, circular recesses 38 are generated in the brace 32. These form in the finished motor vehicle controls 1 the bearing housings 6 in the bearing housing section 9 of the steering element 2.

Furthermore, the upper flanges 35, 36 of the belts 33, 34 are processed via shear cutting technology in the production step OP10. Here, the length sections are removed at the upper flanges 35 as well as at the lower flanges 36 (see also the illustration of FIG. 5B). The processing by shear cutting technology of the length section 31 in the manufacturing step OP10 occurs vertically in the z-direction of the extruded length profile.

In a next production step OP20, processing takes place by shear cutting technology of the belts 33, 34 of the length section 31. They are also removed here sectionally. It is discernible that the belt sections are removed up to the level of the brace 32. This can also be seen in FIG. 5C.

In the production step OP30 (see also FIG. 5D), another processing by shear cutting technology and/or die-cutting is carried out of the length section 31 which is still in one piece. Here, front brace sections are removed and the length section 31 is divided into individual extrusion profiles 39. Also in this regard, reference is made to the illustration of FIG. 5D, which shows the extrusion profile 39 after splitting the length section 31 into several extrusion profiles 39.

From the brace 32 of the length section 31, the middle part 3 of the extruded profile 39 or the steering element 2 and from the belts 33, 34, and the flanges 35, 36, the side arms 4, 5 have been produced with side walls 13, 14.

In the production step OP40, the conversions 19, or 23, 24 are generated on the side edges 18 or 22 of the middle part 3. In addition, the beads 29, 30 are formed in the connection sections 11, 12.

Finally, a mechanical processing of the extrusion profiles 39 takes place in the production step OP50. Here, in particular the bearing housings 7, 8 are produced in the side walls 13, 14 of the side arms 4, 5. A finalized motor vehicle control 1 or the steering element 2 is shown in FIG. 5F. With regard to FIG. 5F, it must be noted that the motor vehicle control 1 or the steering element 2 show beads 29, 30, which are embodied shorter than the beads 29, 30 described above, described in the illustrations of FIGS. 6 to 9.

In the explained production sequence, the production steps OP10, OP20 and OP30 are carried out successively. Here, a punching process is initially carried out in the vertical direction (z-axis). In OP20, a technical punching process takes place of the length section 31 in the transverse direction (y-axis). Further processing takes place in the production step OP30. Here, the length section 31 is also divided into individual extrusion profiles 39. The manufacturing steps can generally occur successively, but also simultaneously, in particular the shear cutting and/or punch operations of the production steps OP20 and OP30 can be carried out at the same time.

Figure 4:
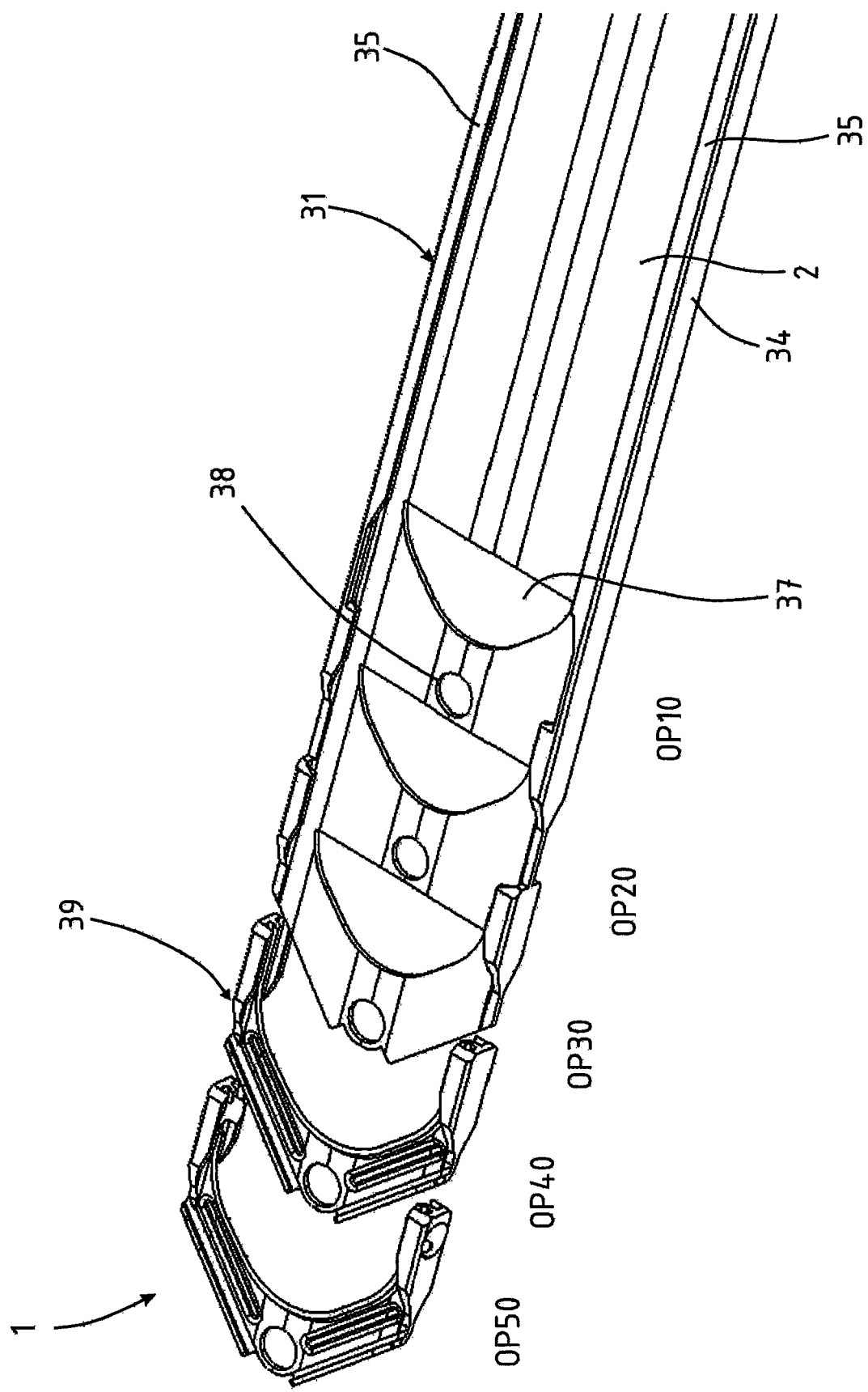
FIG. 4 production of motor vehicle controls.

The illustration of FIG. 4 illustrates the sequence once more. Mutually correlating parts or components of parts are marked with identical reference numbers. Based on FIG. 4, the aspect is explained that first the length section 31 of an extruded profile strand is successively or simultaneously processed in several technical shear cutting steps. Here, the essential shaping of the later motor vehicle control 1 is already done. Subsequently, the trimmed or processed length section 31 is divided into individual profile sections and these extrusion profiles 39 are finally configured into the motor vehicle control 1.

The illustrations of FIGS. 5A to 5F show both the manufacturing sequence, in which the provided length section 31 of an extruded profile strand is initially processed in one piece via shear cutting technology and then divided into extruded profiles.

Figure 5A:
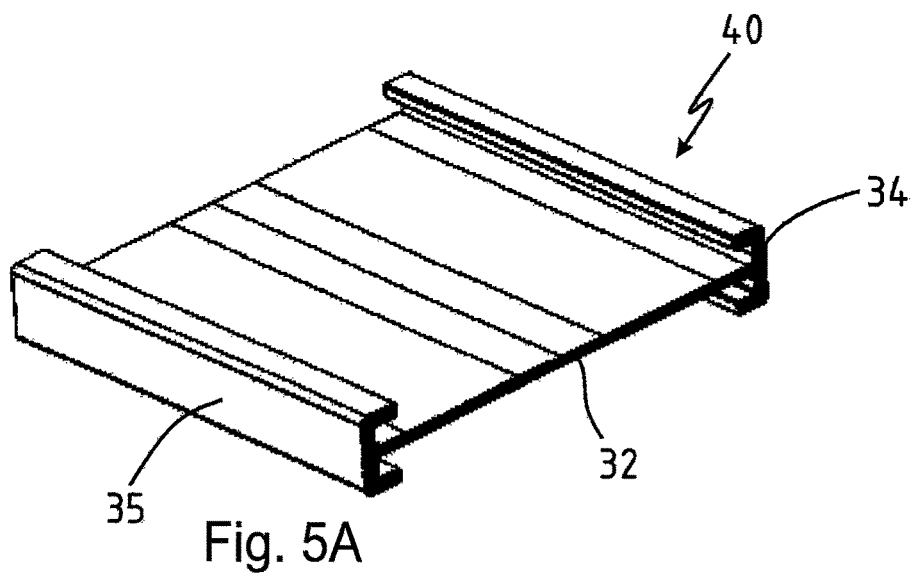
FIG. 5 consists of FIGS. 5A, 5B, 5C, 5D, 5E and 5F showing the sequence of steps for producing motor vehicle controls.
Figure 5B:
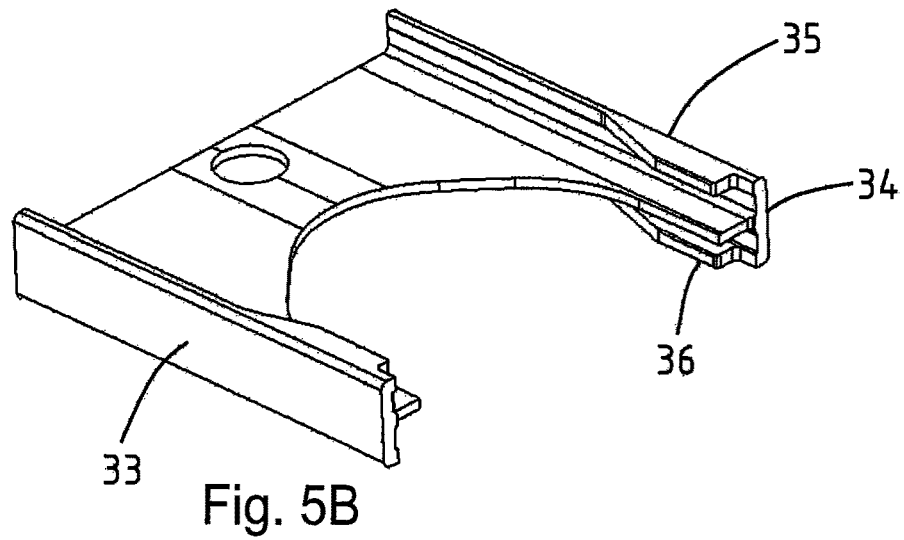
Figure 5C:
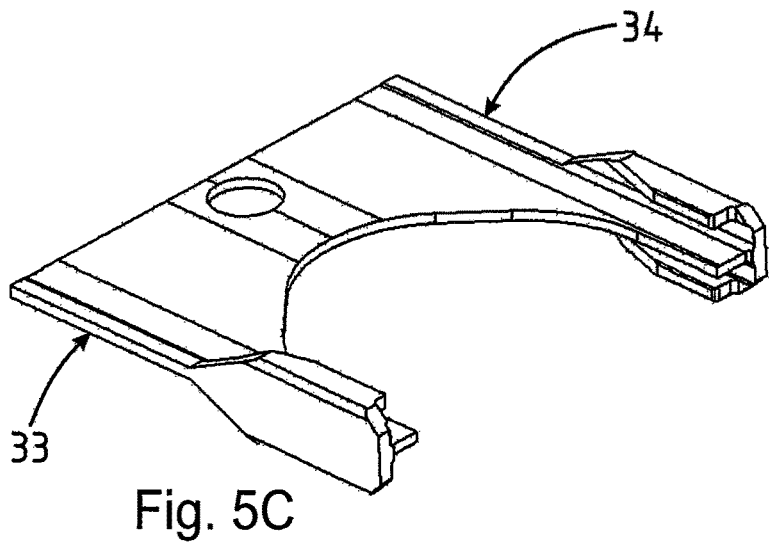
Figure 5D:
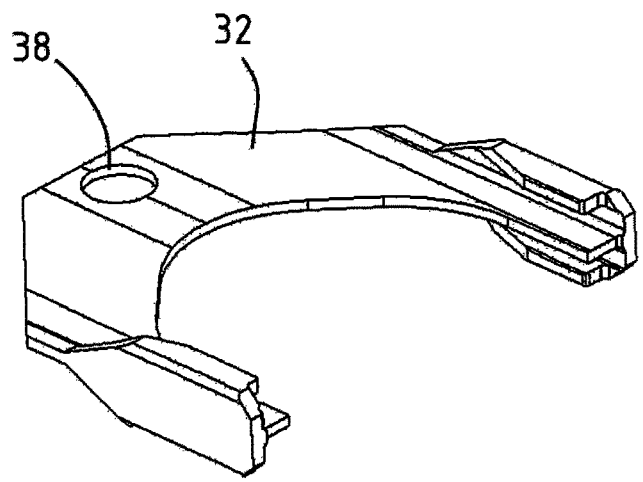
Figure 5E:
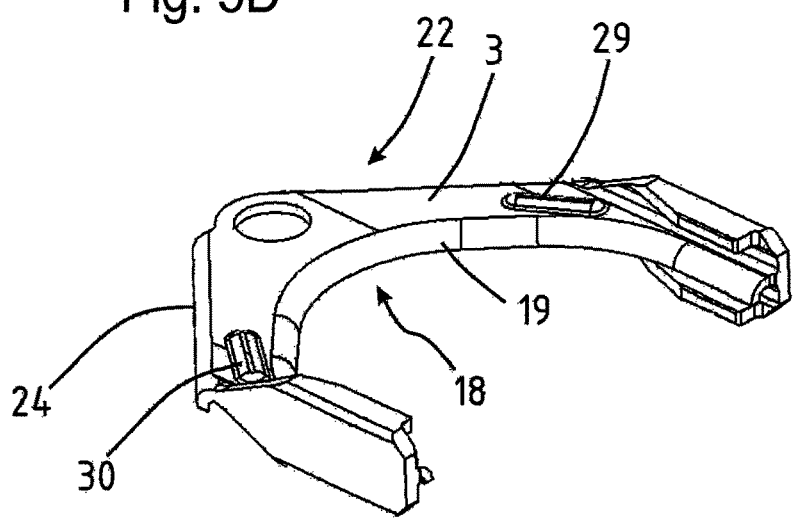
Figure 5F:
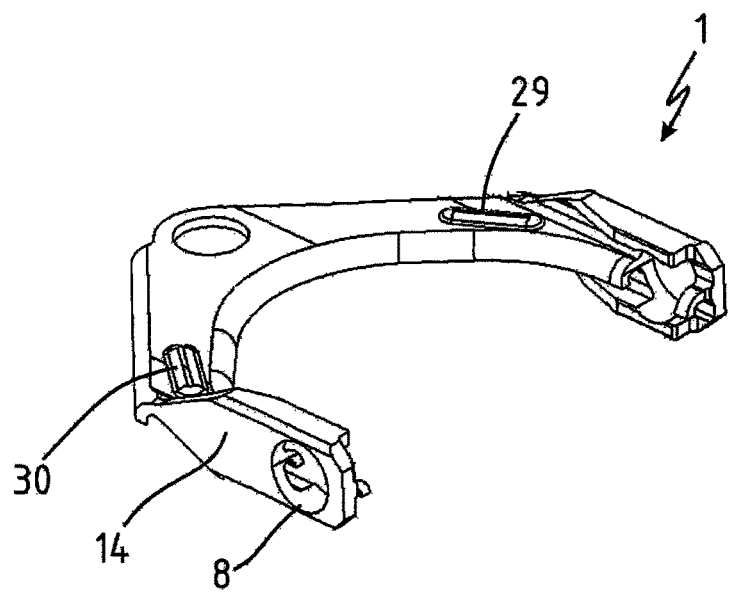

An alternative production sequence provides that the length section 31 is divided into extruded profiles 40, one of which being shown in FIG. 5A. Then the processing by shear cutting technology of the extrusion profiles 40 is carried out with the punch processes, as explained above, and the mechanical processing of the brace 32, as well as the belts 33, 34, and the upper and lower flanges 35, 36 (see FIGS. 5B to 5D). The production sequences and processes then correspond to the production steps OP10 to OP50, as explained above. After the conversions 19, 23, 24, and the beads 29, 30 were generated, as shown in the illustration of FIG. 5E, the mechanical processing and the manufacture of the bearing housings 6, 7 are carried out in the end sections 15, 16 of the side arms 4, 5 (FIG. 5F).

REFERENCE NUMBERS

1—Motor vehicle control
2—Steering element

3—Middle part
4—Side arm
5—Side arm
6—Bearing housing
7—Bearing housing
8—Bearing housing
9—Bearing housing section
10—Ball joint
11—Connection section
12—Connection section
13—Side wall of 4, 5
14—Side wall of 4, 5
15—End section of 13, 14
16—End section of 13, 14
17—Bearing socket
18—Side edge of 3
19—Conversion
20—free end of 15, 16
21—free end of 15, 16
22—Side edge
23—Conversion of 22
24—Conversion of 22
25—frontal arch area of 9
26—upper flange section
27—lower flange section
28—Diagonal section
29—Bead
30—Bead
31—Length section
32—Brace
33—Belt
34—Belt
35—Flange
36—Flange
37—Recess
38—Recess
39—Extrusion profile

The invention claimed is:

1. A method for producing motor vehicle controls from extruded profiles comprising the following steps:
   a) providing a length section of an extruded profile strand, and
   b1) producing by shear cutting of the length section, c1) splitting the produced length section into multiple extruded profiles, or
   b2) splitting the length section into several extruded profiles, c2) producing by shear cutting the extruded profiles, and
   d) mechanical processing of the extruded profiles into a motor vehicle control wherein the length section has a double T-shaped cross-section, which comprises a brace and two belts aligned perpendicular in reference to the brace and at the end of the belts flanges are connected, wherein recesses are punched in the brace during the shear-cutting of the length sections (step b1)) or during the shear-cutting of the extruded profiles (step c2)), and removing sections of the flanges or the belts.

2. The method according to claim 1, wherein bearing housings are produced during the processing via the shear-cutting of the length sections (step b1) or by the shear-cutting of the extruded press profiles (step c2)) or during the mechanical processing of the extruded profiles (step d)).

3. The method according to claim 1, wherein the mechanical processing of the extruded profiles (step d)) includes formation of conversions or beads.

4. The method according to claim 1, wherein the length section or the extruded profile separated therefrom is aligned transverse to the longitudinal direction (x-direction).

5. The method according to claim 1, wherein the length section or the extruded profiles or the motor vehicle control are subjected to a heat treatment.

6. A method for producing motor vehicle control from extruded profiles comprising the following steps:
   a) providing a length section of an extruded strand, and
   b1) producing by shear cutting of the length section c1) splitting the produced length section into multiple extruded profiles, or
   b2) splitting the length section into several extruded profiles, c2) producing by shear cutting the extruded profiles, and
   d) mechanical processing of the extruded profiles into a motor vehicle control, wherein the length section or an extruded profile separated therefrom is aligned transverse to the longitudinal direction (x-direction).

7. The method according to claim 6, wherein bearing housings are produced during the processing via the shear-cutting of the length section (step b 1) or by the shear cutting of the extruded press profiles (step c2) or during the mechanical processing of the extrusion profiles (step d)).

8. The method according to claim 6, wherein the mechanical processing of the extruded profiles (step d)) includes formation of conversions or beads.

9. The method according to claim 6, wherein the length section has a double T-shaped cross-section, which comprises a brace and two belts aligned perpendicular in reference to the brace and at the end of the belts flanges are connected.

10. The method according to claim 6 wherein recesses are punched in the brace during the shear-cutting of the length section (step b1)) or during the shear-cutting of the extruded profiles (step c2)), and removing sections of the flanges or the belts.

11. The method according to claim 6, wherein the length section or the extruded profiles or the motor vehicle control are subjected to a heat treatment.

\* \* \* \* \*